United States Patent [19]
Waldbeser et al.

[11] Patent Number: 5,263,824
[45] Date of Patent: Nov. 23, 1993

[54] REMOTE CONTROLLED SHUTDOWN FOR HAZARDOUS MATERIAL TRANSPORT VEHICLE

[75] Inventors: Fred J. Waldbeser, Loda; Ronald A. Warren, Rankin, both of Ill.

[73] Assignee: Fredron Corp., Loda, Ill.

[21] Appl. No.: 973,173

[22] Filed: Nov. 9, 1992

[51] Int. Cl.$^5$ .................. F04B 15/04; B60K 26/00
[52] U.S. Cl. .................................. 417/10; 417/63; 180/324; 251/129.04
[58] Field of Search ............... 417/10, 63; 180/323, 180/324; 137/129.04

[56] References Cited

U.S. PATENT DOCUMENTS

| | | | |
|---|---|---|---|
| 3,786,869 | 1/1974 | McLoughlin | 417/34 |
| 3,974,879 | 8/1976 | Nelson, Jr. et al. | 251/129.4 |
| 4,236,594 | 12/1980 | Ramsperger | 123/179.2 |
| 4,582,108 | 4/1986 | Markow et al. | 251/129.04 |
| 4,790,514 | 12/1988 | Marks | 251/129.4 |
| 4,839,310 | 6/1989 | Scott et al. | 251/129.4 |
| 4,893,240 | 1/1990 | Karkouti | 123/179.3 |
| 5,042,439 | 8/1991 | Tholl et al. | 123/179.2 |
| 5,054,569 | 10/1991 | Scott et al. | 123/179.2 |
| 5,140,311 | 8/1992 | Cook | 417/63 |
| 5,189,392 | 2/1993 | Kass et al. | 251/129.4 |

*Primary Examiner*—Richard E. Gluck
*Assistant Examiner*—Roland G. McAndrews, Jr.
*Attorney, Agent, or Firm*—Emrich & Dithmar

[57] ABSTRACT

A safety shutdown system for a vehicle containing a hazardous fluid material such as gasoline, liquid propane gas (LPG) or anhydrous ammonia ($NH_3$) permits turn-off of the vehicle's engine and closure of the vehicle's storage tank valves by the vehicle's operator remotely located from the vehicle. The system includes a hand-held controller including a receiver and transmitter as well as a receiver/transmitter combination located in the vehicle's cab. The transmitter in the cab is coupled to a vehicle-mounted flow meter for providing an RF signal to the remote receiver for display on the hand-held controller of the amount of material discharged from the vehicle's tank. The cab-mounted receiver is responsive to an operator-initiated shutdown signal emitted by the remote controller and is coupled to a pulling solenoid which is, in turn, coupled to the storage tank valves via a cable for closing the valves and stopping the flow of hazardous material when the controller is actuated. Receipt of a shutdown signal by the vehicle-mounted receiver also results in immediate turn-off of the vehicle's engine to prevent a spark-initiated explosion and turn-off of an engine powered discharge pump attached to the vehicle's storage tank. The remotely controlled shutdown system provides safe and reliable control of hazardous material handling, particularly in an emergency situation such as in-volving a fire or accidental spill of the material.

16 Claims, 2 Drawing Sheets

REMOTE CONTROLLED SHUTDOWN FOR HAZARDOUS MATERIAL TRANSPORT VEHICLE

FIELD OF THE INVENTION

This invention relates generally to the storage and transport of hazardous fluids in vehicles such as trucks, and is particularly directed to the rapid termination of hazardous fluid flow from a vehicle mounted tank by a person remotely located from the vehicle such as in an emergency.

BACKGROUND OF THE INVENTION

Truck mounted tanks are commonly used for transport and delivery of hazardous materials such as propylene, butane, gasoline, liquid propane gas (LPG), anhydrous ammonia ($NH_3$) and diesel fuel. The truck may take the form of what is known as a "bobtail" truck where the tank is coupled directly to the truck frame, or a tractor-trailer combination where the tank is mounted directly to the trailer frame. In either case, a first inlet valve is provided for filling the tank from a bulk plant or other vehicle, and a second outlet valve allows for discharging the fluid from the vehicle storage tank.

All bobtail trucks, tractor-trailer combinations and bulk plants that handle any of the aforementioned hazardous materials are required by state and federal law to include a safety release system. The safety release system typically includes a manually operated release handle mounted to an aft portion of the cab in the case of a bobtail truck and to a forward portion of the trailer adjacent the cab in a tractor-trailer combination. The release handle is coupled by means of either cables or air-activated RAMs to storage tank valves on the vehicle to close the tank outlets in a hazardous situation such as a spill or a fire. In order for the safety system to be actuated, the operator must be within arm's length of the safety release handle. However, when dealing with highly flammable materials, which may also be highly contaminating and corrosive and which also frequently are maintained under high pressure within the storage tank, operator access to the safety release handle may be physically impossible in most hazardous situations typically encountered. Indeed, in the case of a fire or spill, the operator may be seriously injured or killed even attempting to reach the safety release handle. Moreover, even if the vehicle operator is able to close the storage tank valves, he must then enter the vehicle cab to turn the vehicle's engine off to prevent the possibility of an explosion or fire caused by the vehicle's ignition system. The performance of one or both of these actions requires precious seconds which may mean the difference between life and death, between total destruction and a minor, contained accident.

In off-loading the vehicle's storage tank, the operator checks the number of gallons discharged from the tank as indicated on a vehicle-mounted digital readout with a percent fill gauge on the customer's storage tank to avoid an overfill situation and material leakage in the event of indicator or flow sensor malfunction. This requires the operator to leave the vehicle for what frequently is an extended period. The distance from the delivery truck to the stationary storage tank may in some cases be considerable, making the vehicle's safety release system for all practical purposes inaccessible in the event of an accident. At pressures of 250 pounds per square inch, a large quantity of hazardous material may be discharged in a very short period of time.

The present invention addresses the aforementioned limitations of the prior art by greatly reducing the possibility of injury and property damage when a break occurs in plumbing, hoses, etc., of a vehicle storage tank containing a hazardous material resulting in a spill. An operator actuated, remotely located controller allows an operator to immediately close all tank valves upon detection of a potentially dangerous situation. The remote controller also allows for immediate shutdown of the vehicle's engine in eliminating it as a source of combustion ignition and terminating the operation of the vehicle's discharge pump.

OBJECTS AND SUMMARY OF THE INVENTION

Accordingly, it is an object of the present invention to provide for the safe handling of hazardous fluid stored in a tank mounted to a vehicle.

Another object of the present invention is to provide for the remote actuation from a safe distance of vehicle storage tank valve closure and vehicle engine shut off in an emergency situation such as hazardous material leakage from the storage tank or a fire.

These objects of the present invention are achieved and the disadvantages of the prior art are eliminated by apparatus for use in a hazardous material transport vehicle having an ignition system for electrically energizing an engine in the vehicle, wherein a hazardous fluid material is stored in a tank having a vapor valve for equalizing vapor pressure during transfer of the fluid material and a discharge valve for discharging the material from the tank by means of a vehicle-driven pump. The apparatus provides for sealing off the tank in the event of a hazardous situation and includes a remote, hand-held controller responsive to an operator input for providing a first RF shutdown signal. The first RF shutdown signal is provided to a vehicle-mounted RF receiver responsive to the shutdown signal for providing a second signal to the vehicle's ignition system for electrically de-energizing the vehicle's engine and turning off the vehicle-driven pump. The system further includes a cable mounted to the vehicle and coupled to the discharge valve and to the vapor valve for closing the valves when displaced from a first position in which the valves are open to a second closed position. A solenoid coupled to the cable and to the vehicle-mounted RF receiver and responsive to the second signal actuates the cable to the second closed position for closing the discharge and vapor valves.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
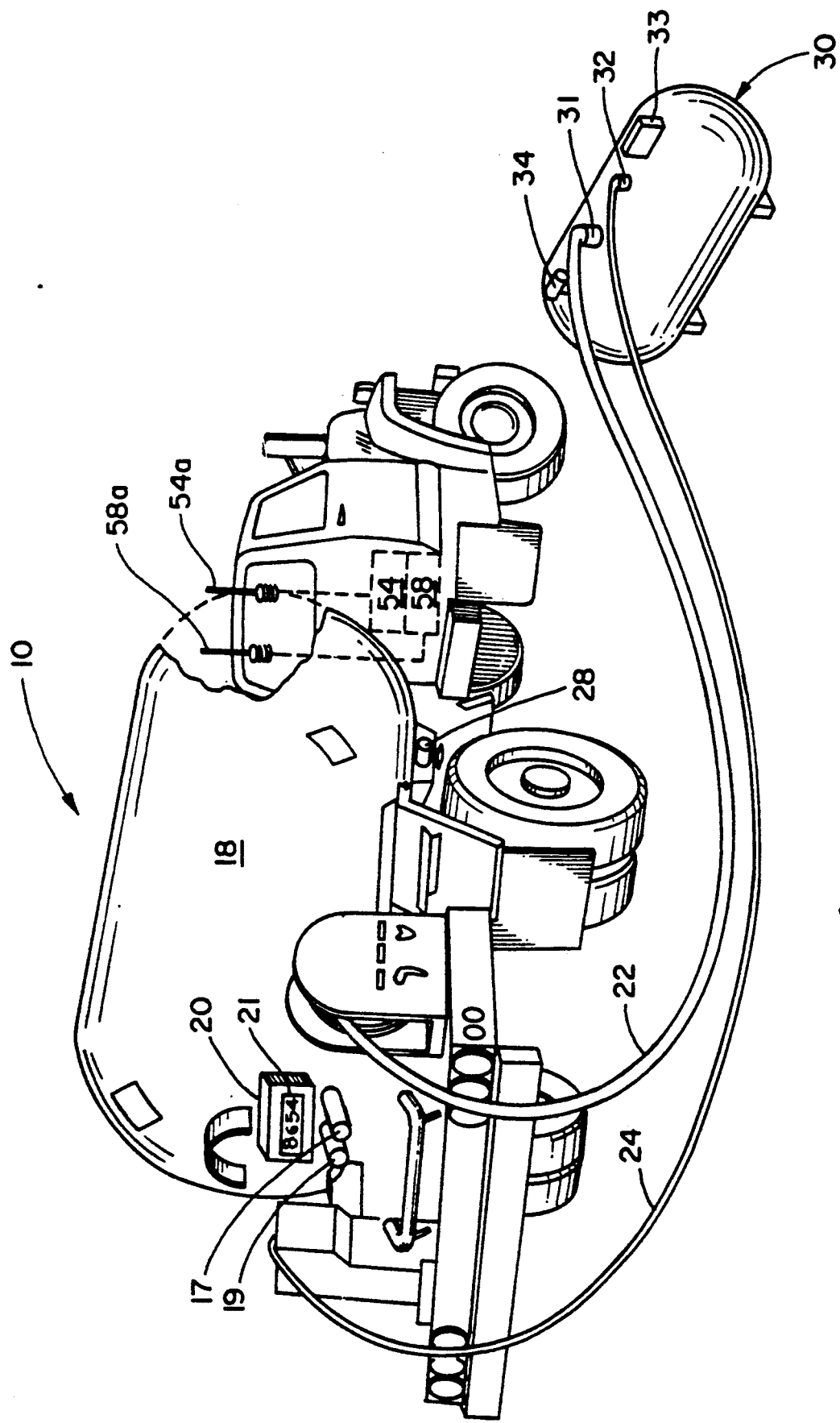
FIG. 1 is a perspective view of a tank for hazardous fluid material mounted to a vehicle shown filling a storage tank.

Referring to FIG. 1, there is shown a perspective view of a vehicle 10 for storing and transporting a hazardous material in fluid form. Vehicle 10 is shown as a "bobtail" truck, although the present invention is not limited to use in this type of vehicle, but is also adapted for use in a tractor-trailer type of vehicle used for hauling hazardous materials. Vehicle 10 includes a storage tank 18 in which is stored the hazardous fluid material. Storage tank 18 is securely mounted to and supported by the frame of vehicle 10. Disposed on an aft portion of storage tank 18 is an intake valve 17 which permits filling the storage tank with the hazardous material. Also disposed on an aft portion of storage tank 18 is a vapor equalization valve 19 for equalizing vapor pressure during filling or off-loading of storage tank 18. A flow meter 20 monitors flow of the hazardous material out of storage tank 18, while a digital display 21 provides a display of the quantity of fluid, typically in gallons or liters, off-loaded from storage tank 18. Storage tank 18 on vehicle 10 is shown filling a fixed storage tank 30 via a discharge hose 22. A second vapor hose 24 also coupled between the vehicle tank 18 and storage tank 30 provides a pressure equalizing function for the storage tank relative to the vehicle storage tank during filling of the storage tank.

The hazardous material is discharged from the vehicle mounted storage tank 18 via a discharge valve (not shown) and a discharge pump 28 typically located on a lower portion of the storage tank. The discharge valve and discharge pump 28 combination is coupled to the discharge hose 22 for delivery of the hazardous material to an end user's storage tank 30 such as for use in heating a home, powering an engine, or drying agricultural crops. A pressure equalizing hose, or line, 24 coupled between vehicle storage tank 18 and storage tank 30 equalizes vapor pressure between these two tanks to facilitate filling of the storage tank. Pressure equalizing hose 24 is coupled to storage tank 30 via a vapor equalization valve 32, while discharge hose 22 is coupled to storage tank 30 via an inlet valve 31. Storage tank 30 further typically includes a pressure release valve 34 and a fill percent gauge 33 for providing a visual indication of the extent to which the storage tank is filled. As thus far described, the hazardous material transport vehicle 10 and storage tank 30 are conventional in design and operation.

Figure 2:
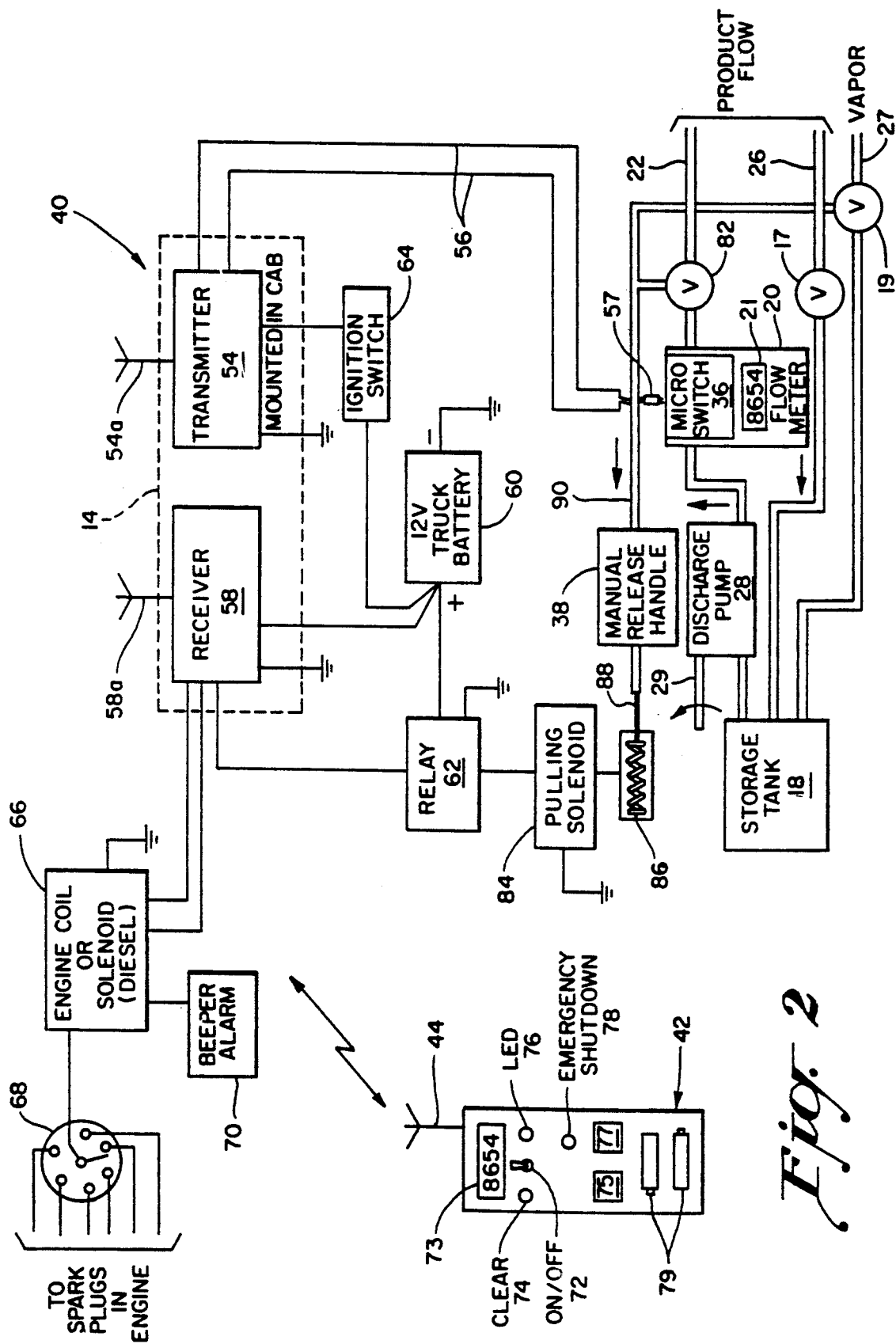
FIG. 2 is a simplified combined block and schematic diagram of a remote controlled shutdown system for a vehicle mounted storage tank containing a hazardous material in accordance with the principles of the present invention.

With reference to FIG. 1 and also to the combined block and schematic diagram of FIG. 2, a hazardous material transport vehicle 10 in accordance with the present invention includes an RF transmitter 54 and receiver 58 combination in the tractor cab 14 which cooperates with a hand-held remote controller 42 as described in detail in the following paragraphs. As shown in FIG. 2, flow meter 20 is coupled to the storage tank 18 for providing a digital display 21 of the fluid off-loaded from the storage tank. Hazardous material product flow is from the storage tank 18 via an outlet, or discharge, valve 82. Inlet valve 80 couples an intake hose 26 to storage tank 18, while outlet valve 82 is positioned on a lower surface of the storage tank and cooperates with the discharge pump 28 coupled to the discharge hose 22 as previously described.

Vehicle-mounted transmitter 54 is coupled by means of a connector 57 and suitable leads 56 to flow meter 20. A microswitch 36 may be incorporated in existing flow meters 20 to permit the flow meter to directly interface with transmitter 54. From flow meter 20, transmitter 54 receives a running count of the hazardous material pumped out of storage tank 18. Transmitter 54 is coupled to the vehicle 12 VDC battery 60 by means of the vehicle's ignition switch 64. Thus, whenever the vehicle's ignition switch 64 is turned on and fluid material is flowing out of storage tank 18 via flow meter 20, transmitter 54 emits an RF signal representing the amount of material either in gallons or liters discharged from the storage tank via a transmitter antenna 54a mounted to the tractor cab 14 such as on its rear window as shown in FIG. 1. The RF signal representing material flow out of storage tank 18 is received via an antenna 44 and provided to a receiver 77 in the remote controller 42. Remote controller 42 includes a digital read-out 73 for providing a remotely located operator with material flow information out of storage tank 18. Remote controller 42 is energized by a plurality of conventional storage batteries 79 and further includes an ON/OFF toggle-switch 72 for activating or deactivating the remote controller. A CLEAR DISPLAY push button switch 74 allows for resetting the digital read-out 73 to zero such as when storage tank 18 is emptied. An EMERGENCY SHUTDOWN push button switch 78 on the remote controller 42 permits an operator to provide a remotely generated signal to the receiver antenna 58a on the tractor cab 14 for closing the valves on storage tank 18 as described below such as in an emergency situation. When the EMERGENCY SHUTDOWN switch 78 is selected, a signal is provided to a transmitter 75 in the remote controller 42 for transmission of an appropriate shutdown signal via antenna 44 to the vehicle's cab-mounted receiver 58.

Vehicle-mounted receiver 58 is also coupled to and energized by the vehicle's 12 VDC battery 60. Receiver 58 is further coupled to the engine's coil 66 in the case of a gasoline engine or to the solenoid of a diesel engine. Upon receipt of a shutdown signal from the remote controller 42, receiver 58 discharges the engine coil 66. With high inductive energy no longer stored in the engine coil 66, the coil is unable to render sufficient voltage to the vehicle's distributor 68 for igniting the spark plugs and driving the vehicle's engine. As a result, the vehicle's engine is quickly shutdown and an explosion or combustion of the hazardous material caused by a vehicle ignition system initiated spark is prevented. A beeper alarm 70 is coupled to the engine coil 66 to provide an aural indication of engine shutdown.

Receiver 58 is also coupled via a relay 62 to a pulling solenoid 84. Pulling solenoid 84 includes a coil 86 and a moveable iron core 88. Iron core 88 is coupled via a manual release handle 38 to the vehicle's actuator cable 90 which is, in turn, coupled to the outlet valve 82 as well as to a vapor valve 92 in a vapor line 27. Upon receipt of a shut-down signal by receiver 58 from the remote controller 42, the receiver provides an appropriate signal via .relay 62 to the pulling solenoid 84 for displacing the actuator cable 90 in the direction of the arrow in FIG. 2 so as to close the intake and outlet valves 17, 82 as well as vapor valve 19. Receipt by the pulling solenoid 84 of a shutdown signal results in displacement of the actuator cable 90 so as to ensure that the outlet valve 82 is closed. Discharge pump 28 is typically driven by a power take-off shaft 29 from the vehicle's transmission (not shown in the figures for simplicity) which is, in turn, driven by the vehicle's engine. Deactivation of the engine coil 66 resulting in shutdown of the vehicle's engine also results in shutdown of the discharge pump 28 on the storage tank 18 further preventing discharge of the hazardous material from the storage tank and ensuring its confinement within the storage tank.

The digital read-out 73 on the remote controller 42 permits an operator to closely monitor the quantity of hazardous material discharged from storage tank 18. During discharge, as the operator monitors the metered amount of hazardous material discharged from storage tank 18 into storage tank 30 presented on digital read-out 73, the operator will simultaneously be able to view the percent fill indicator 33 on storage tank 30 to verify the amount of material delivered. This back-up verification of the amount of hazardous material delivered substantially reduces the possibility of overfilling and accidental discharge of the hazardous material in either liquid or vapor form.

There has thus been shown a remote controlled shutdown arrangement for a hazardous fluid material transport vehicle which permits an operator remotely and safely located from the vehicle to close valves of the vehicle's storage tank in the event of an emergency such as a fire or spill. When the storage tank's valves are closed, the vehicle's engine is also shutdown to prevent an engine spark from igniting leaking fluid and for shutting down an engine-operated discharge pump connected to the vehicle storage tank. The hand-held remote controller also provides the operator with a digital read-out of the amount of hazardous material provided to a storage tank for monitoring the amount of fluid material delivered.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use in a hazardous material transport vehicle having an ignition system for electrically energizing an engine in said vehicle, wherein a hazardous fluid material is stored in a tank having a vapor valve for vapor pressure equalization and a discharge valve for emptying the tank by means of a vehicle-driven pump, apparatus for closing said valves and sealing off said tank in the event of a dangerous situation, said apparatus comprising:

a remote, hand-held controller responsive to an operator input for providing a first RF shutdown signal;
   a vehicle-mounted RF receiver responsive to said shutdown signal for providing a second signal;
   electrical means in the vehicle's ignition system coupled to said vehicle-mounted RF receiver and responsive to said second signal for electrically de-energizing the vehicle's engine and turning off the vehicle-driven pump;
   cable means mounted to said vehicle and coupled to the discharge and vapor valves for closing said valves when displaced from a first position in which said valves are open to a second closed position; and
   solenoid means coupled to said cable means and to said vehicle-mounted RF receiver and responsive to said second signal for actuating said cable to said second closed position and closing said discharge and vapor valves.

2. The apparatus of claim 1 further comprising a relay coupling said vehicle-mounted RF receiver to said solenoid means for providing said second signal to said solenoid means.

3. The apparatus of claim 1 wherein said remote controller includes an EMERGENCY SHUTDOWN selector responsive to an operator input for providing said RF shutdown signal to said vehicle-mounted RF receiver.

4. The apparatus of claim 1 wherein said vehicle includes a cab and a vehicle-mounted RF transmitter, and wherein said vehicle-mounted RF receiver and transmitter are located in said cab.

5. The apparatus of claim 1 wherein the vehicle further includes a manual release handle coupled to said cable means for manually closing said valves, and wherein said solenoid means is coupled to said manual release handle for activating said cable means to said second closed position and closing said discharge and vapor valves.

6. The apparatus of claim 1 wherein said transport vehicle includes a gasoline engine and wherein said electrical means includes a high voltage coil coupled to a distributor in the ignition system, wherein said distributor is coupled to and provides a spark to said gasoline engine for electrically energizing said gasoline engine.

7. The apparatus of claim 6 further comprising alarm means coupled to said high voltage coil for providing an indication of shutdown of the vehicle's engine and said vehicle-driven pump and closure of said vapor and discharge valves.

8. The apparatus of claim 7 wherein said alarm means comprises an audio beeper alarm.

9. The apparatus of claim 1 wherein said engine is a diesel engine and said electrical means is a solenoid for terminating fuel flow to said diesel engine.

10. The apparatus of claim 9 further comprising alarm means coupled to said solenoid for providing an indication of diesel engine and vehicle-driven pump shutdown and closure of said vapor and discharge valves.

11. The apparatus of claim 10 wherein said alarm means includes an audio beeper alarm.

12. The apparatus of claim 1 further comprising flow meter display means coupled to said discharge valve for recording and displaying the amount of fluid material discharged from the tank.

13. The apparatus of claim 12 further comprising a vehicle-mounted RF transmitter and a remote RF receiver in said hand-held controller, and wherein said vehicle-mounted RF transmitter is coupled to said flow meter display means for providing to said remote RF receiver an RF signal representing the amount of fluid material discharged from the tank to a storage tank.

14. The apparatus of claim 13 wherein said remote controller includes digital display means for providing a visual display of the amount of fluid discharged from the tank.

15. The apparatus of claim 14 wherein said remote controller further includes manual reset means for resetting said digital display means to zero when the storage tank is emptied.

16. For use in a hazardous material transport vehicle having an ignition system for electrically energizing an engine in said vehicle, wherein a hazardous fluid material is stored in a tank having a vapor valve for equalizing vapor pressure in said tank during discharge of said tank and a discharge valve for discharging the fluid material from said tank by means of a vehicle-driven pump, apparatus for closing said valves and sealing off said tank in the event of a dangerous situation, said apparatus comprising:

a remote, hand-held controller responsive to an operator input for providing a first RF shutdown signal;

a vehicle-mounted RF receiver responsive to said shutdown signal for providing a second signal;

electrical means in the vehicle's ignition system coupled to said vehicle-mounted RF receiver and responsive to said second signal for electrically de-energizing the vehicle's engine and turning off the vehicle-driven pump;

cable means mounted to said vehicle and coupled to the intake and discharge valves for closing said valves when displaced from a first position in which said valves are open to a second closed position;

solenoid means coupled to said cable and to said vehicle-mounted RF receiver and responsive to said second signal for actuating said cable to said second closed position and closing said vapor and discharge valves;

alarm means coupled to said electrical means for providing an alarm indication of shutdown of the vehicle's engine and closure of said vapor and discharge valves;

flow meter display means coupled to said discharge valve for recording and displaying the amount of material removed from the vehicle tank during discharge, said flow meter display means further coupled to said vehicle-mounted RF transmitter for providing an RF material flow signal representing the amount of material discharged from the tank; and a remote RF receiver in said hand-held controller responsive to said RF material flow signal for providing a remotely located operator with an indication of the amount of fluid discharged from the tank.

* * * * *

UNITED STATES PATENT AND TRADEMARK OFFICE
CERTIFICATE OF CORRECTION

PATENT NO. : 5,263,824

DATED : November 23, 1993

INVENTOR(S) : Fred J. Waldbeser and Ronald A. Warren

It is certified that error appears in the above-identified patent and that said Letters Patent is hereby corrected as shown below:

IN THE ABSTRACT:

LINE

26       "in-volving" should be --involving--

Signed and Sealed this

Twenty-first Day of June, 1994

Attest:

BRUCE LEHMAN

Attesting Officer      Commissioner of Patents and Trademarks